United States Patent
Munoz (10) Patent No.: US 10,330,039 B2
(45) Date of Patent: Jun. 25, 2019

(54) SAFETY DEVICE FOR AN ELECTRONIC BOARD CAPABLE OF IDENTIFYING A LEAKAGE OF AQUEOUS UREA SOLUTION

(71) Applicant: AKWEL SA, Champfromier (FR)

(72) Inventor: Regis Munoz, Saint Rambert d'Albon (FR)

(73) Assignee: AKWEL SA, Champfromier (FR)

( * ) Notice: Subject to any disclaimer, the term of this patent is extended or adjusted under 35 U.S.C. 154(b) by 91 days.

(21) Appl. No.: 15/604,302

(22) Filed: May 24, 2017

(65) Prior Publication Data

US 2017/0342929 A1    Nov. 30, 2017

(30) Foreign Application Priority Data

May 24, 2016    (FR) ..................... 16 54630

(51) Int. Cl.
| | |
|---|---|
| *F01N 3/00* | (2006.01) |
| *F02D 41/22* | (2006.01) |
| *F01N 3/20* | (2006.01) |
| *F01N 11/00* | (2006.01) |
| *G01M 3/02* | (2006.01) |
| *G01M 3/18* | (2006.01) |

(52) U.S. Cl.
CPC .......... *F02D 41/22* (2013.01); *F01N 3/208* (2013.01); *F01N 11/00* (2013.01); *G01M 3/025* (2013.01); *G01M 3/18* (2013.01); *F01N 2550/05* (2013.01); *F01N 2610/02* (2013.01); *Y02A 50/2325* (2018.01); *Y02T 10/24* (2013.01); *Y02T 10/47* (2013.01)

(58) Field of Classification Search
CPC .. F01N 11/00; F01N 2550/05; F01N 2610/02; F02D 41/22
See application file for complete search history.

(56) References Cited

U.S. PATENT DOCUMENTS 5,564,904 A    10/1996    Heckman
9,625,346 B2*    4/2017    Nienhoff ................. F01N 3/208
(Continued)

FOREIGN PATENT DOCUMENTS

| DE | 10 2006 051 926 A1 | 5/2008 |
|---|---|---|
| DE | 10 2012 219 151 A1 | 5/2013 |

(Continued)

*Primary Examiner* — Audrey K Bradley
*Assistant Examiner* — Anthony Ayala Delgado
(74) *Attorney, Agent, or Firm* — Oliff PLC (57) ABSTRACT

A safety device intended to detect a leakage in a dry area of an automotive liquid used in a fluid circuit onboard a vehicle, the automotive liquid containing at least one dangerous substance other than water, such as urea, the device including a detection cell sensitive, on the one hand, to the presence of a liquid in the dry area and, on the other hand, to the possible dangerous substance content of the liquid, the device also including a selective analysis unit, capable of distinguishing on the one hand whether the detection cell is in the presence of a liquid or not, and on the other hand, in the presence of liquid, whether the present liquid corresponds to the automotive liquid containing the dangerous substance or to another liquid, called « neutral liquid », such as a water condensate.

14 Claims, 2 Drawing Sheets

(56) References Cited

U.S. PATENT DOCUMENTS

| | | | |
|---|---|---|---|
| 2008/0184775 A1* | 8/2008 | Yamagishi | G01N 27/185 73/25.05 |
| 2011/0217573 A1 | 9/2011 | Kritzer et al. | |
| 2014/0020763 A1 | 1/2014 | Phlegm et al. | |
| 2015/0128564 A1* | 5/2015 | Upadhyay | F01N 3/2066 60/274 |

FOREIGN PATENT DOCUMENTS

| | | |
|---|---|---|
| DE | 10 2012 103 123 A1 | 10/2013 |
| FR | 2 864 693 A1 | 7/2005 |
| FR | 3 031 547 A1 | 7/2016 |

\* cited by examiner

SAFETY DEVICE FOR AN ELECTRONIC BOARD CAPABLE OF IDENTIFYING A LEAKAGE OF AQUEOUS UREA SOLUTION

The present invention concerns a safety device capable of detecting a leakage of a liquid called «automotive liquid», coming from an onboard fluid circuit within a vehicle or a motor, in an area called «dry area» of said vehicle or said motor, said dry area being named accordingly because said automotive liquid is in principle absent from said area in normal operation, that is to say in the absence of leakage.

More particularly, the invention concerns a safety device capable of detecting a leakage of an automotive liquid formed by, or containing, a urea solution, coming from an onboard urea circuit within a motor vehicle or a motor which uses such a urea circuit to carry out the depollution of the exhaust gases by selective catalytic reduction of nitrogen oxides.

Indeed, a generalization, to most of the motor vehicles, of the depollution circuits designed to inject under pressure into the exhaust gases an aqueous urea solution (a water-urea mixture known under the trade name «AdBlue®») is currently observed.

In so far as a possible leakage of urea can of course compromise the efficiency of the depollution circuit, cause an undesirable dissemination of the urea solution into the environment, or even cause aggravated short-circuits within the onboard electric and electronic circuits, which short-circuits are potentially generator of breakdowns or even fires, it is necessary to provide a safety device capable of detecting such a leakage of urea and of making adequate arrangements, in particular to alert the user of the vehicle as to the need to carry out a repair.

As such, it is known to compare, for example by means of flow-meters placed at different points of the urea circuit, the volume of urea solution effectively injected downstream of the circuit, into the exhaust gas, with the volume of urea solution extracted from the urea reservoir and pressurized by a pump upstream of this same circuit. A deviation between these volumes indicates that the circuit suffers a loss, characteristic of the presence of a leakage.

Another solution consists in measuring, by means of pressure and flow rate sensors, the real operation point (pressure and flow rate of the urea solution) in a portion of the urea circuit, and in comparing the latter with the theoretical operation point which should be observed, taking account of the biasing conditions of the circuit (for example, taking account of the supply voltage applied to the pump). A deviation between the real operation point and the theoretical operation point indicates an abnormal pressure drop characteristic of the presence of a leakage.

For example, it is possible for this purpose to measure the injection pressure as well as the injection flow rate of the urea solution (which can be deduced from the opening time of the injector and the injection pressure), and to compare the real operation regime of the injection pump, characterized by this pressure/flow rate couple, at a theoretical operation regime without leakage.

If they allow a monitoring of the state of the urea circuit, such known safety devices, however, require the use of numerous sensors (in particular pressure and flow rate sensors), as well as calculation units allowing a storage and a processing, sometimes complex, of the data collected by these sensors.

The known safety devices are therefore generally heavy and bulky.

Furthermore, such devices, if they allow detecting a leaking on the pressurized part of the urea circuit, may in contrast not perceive a leakage affecting the non-pressurized part of said circuit, such as the urea reservoir which supplies the pump.

That is why, in some situations, the known devices may not detect leakages of urea of the seepage type, whose particularly low flow rate is below the detection threshold of said devices and therefore allows these leakages to go unnoticed.

Of course, an absence of detection, or a too late detection of a leakage of urea increases the risk of electric breakdown, short-circuit or even fire.

More importantly, if the urea solution enters the wiring harness of the vehicle, said wiring harness is irretrievably damaged. Taking account of the current complexity of a wiring harness, and the difficulty or even the impossibility of carrying out in practice the replacement of such a wiring harness, such a situation can even lead to the pure and simple disposal of the vehicle.

Moreover, it should be noted that the known safety devices deduce the existence of a leakage indirectly, from measurements carried out on the urea circuit, and not from an effective detection of the presence of urea in an area called «dry area» which is, in the absence of leakage, free from urea and which generally contains the electric circuit to be protected.

The fact of resorting to an indirect measurement rather than to a direct detection of the presence of urea can of course affect the reliability of the safety device.

For the reasons mentioned above, the known safety devices do not guarantee absolute safe operation of the motor and/or of the equipped vehicle.

Admittedly, from a strictly hypothetical point of view, one might be tempted to consider solving these problems of reliability and detection threshold by integrating a capacitive humidity sensor with the safety device, which could detect directly and more finely in the dry area the presence of liquid expanding out of the urea circuit, by measuring the variation in the electric capacity induced by the presence of said liquid between two electrodes.

However, such capacitive sensors would in practice be totally unsuitable for such an application, because they are in fact very sensitive to temperature and, above all, to the presence of water, so that they would trigger nuisance alarms, to the slightest significant rise in the relative humidity of the ambient air, to the slightest water projection or to the slightest condensation formation, and sometimes simply due to a lowering under 0° C. of the ambient temperature, and that even though these benign phenomena of condensation or cooling do not pose, contrary to leakages of urea, any danger to the operation or safety of the vehicle.

In doing so, the use of such capacitive sensors would therefore have the consequence of causing totally unjustified service interruptions of the urea circuit and/or other onboard systems.

Yet, such service interruptions are inherently prejudicial to the proper operation of the vehicle and in compliance with environmental standards.

The objects assigned to the invention consequently aim to overcome the aforementioned disadvantages and to propose a new, compact and inexpensive safety device which has an increased reliability in order to guarantee a reliable and rapid detection of the leakages of automotive liquid, and in particular of the leakages of urea solution, and which thus allows effective management of said leakages without unnecessarily disturbing the operation of the concerned fluid circuit or of the nearby systems.

The objects assigned to the invention are reached by means of a safety device intended to detect a leakage of at least one liquid called «automotive liquid» used in a fluid circuit onboard a motor and/or a vehicle, said automotive liquid containing at least one substance called «dangerous substance» that is other than water, for example urea, said device being characterized in that it comprises a detection cell, arranged to perceive the presence of a liquid in an area called «dry area» which is normally, in the absence of leakage, free from said automotive liquid, said detection cell being sensitive, on the one hand, to the presence of a liquid in said dry area and, on the other hand, to the possible dangerous substance content of said liquid, said device also comprising a selective analysis unit, capable of distinguishing on the one hand whether the detection cell is in the presence of a liquid or not, and on the other hand, in the presence of liquid, whether the present liquid corresponds to the at least one automotive liquid containing the dangerous substance or to another liquid, called «neutral liquid», such as a water condensate, such that said analysis unit can selectively control the switching of the safety device from a first mode of operation, corresponding to a normal operation without leakage, to a second mode of operation, corresponding to a safety in case of a leakage, when said analysis unit concludes that the automotive liquid is present, and on the contrary maintain the safety device in its first normal mode of operation as long as said analysis unit concludes that liquid is absent or that only a neutral liquid is present in the dry area.

Advantageously, the invention not only allows to detect the appearance of a liquid in the dry area monitored by the safety device, but also to determine whether the detected liquid corresponds to a liquid really representing a danger, and in particular an electric and/or chemical danger, in that said liquid is likely to cause an aggravated short-circuit and/or aggravated heating, or even a fire, or a release of toxic substances (for example by chemical reaction with present metals), as is the case if said liquid is constituted by a urea solution.

In other words, the device according to the invention is capable of recognizing with high probability, or even with certainty, among several types of possible liquids, the nature of the liquid which has reached the dry area, and thus of evaluating the dangerousness of the situation, said device being for this purpose more particularly capable of differentiating a liquid which has a composition or properties close to those of the considered automotive liquid(s), and more particularly of a urea solution, because such a composition or such properties make said liquid likely to cause serious damages to the protected system, from another neutral liquid having a composition or properties closer to those of pure water (demineralized water), harmless to the protected system.

In this way, the safety device will trigger an alert and/or safety procedure (and more particularly a power supply cut off and/or a service interruption of the system protected by the device) only to good use, that is to say if and only if said device (and more particularly the analysis unit) considers that the detected liquid exposes the protected system to a real risk.

More particularly, the detection cell will advantageously allow the analysis unit to access one property or more properties of the medium in which the detection cell is located, such as, for example, the electric resistivity and the permittivity of said medium, which properties will be chosen so as to provide both quantitative information as to the presence or not of a liquid in said medium and qualitative information as to the chemical nature (composition) of said medium, and therefore a qualitative information as to the nature of the liquid whose presence is detected, and more particularly an indication as to whether the nature of said liquid corresponds or not to the nature of a dangerous automotive liquid, since one and/or the other of said measured properties depends on the dangerous substance content of the detected and analyzed liquid.

Advantageously, such qualitative information will make differentiable from one another several liquids likely to enter, in normal operation or by accident, in the dry area, among which particularly (and at least) the automotive liquid (the urea solution) of the monitored fluid circuit, on the one hand, and the pure water likely to result from a condensation by cooling the atmosphere or the walls of the dry area, on the other hand.

The analysis unit can thus characterize the detected liquid and discriminate between different possible liquids, according to whether the composition and therefore the perceived properties of the liquid will be close to the composition and therefore to the desired properties of an automotive liquid (necessarily coming from a leakage) or, on the contrary, closer to the composition and properties of pure water (demineralised water).

Depending on the type of liquid that the analysis unit will have detected, and more particularly according to whether the analysis unit detects automotive liquid or, on the contrary, pure water, the safety device can then decide, knowingly, to activate or not, selectively, and only if necessary, a safety procedure, and in particular an alert procedure.

Other objects, characteristics and advantages of the invention will appear in more detail upon reading the following description, as well as with the help of the appended drawings, provided only for an illustrative and non-restrictive purpose, among which.

The invention concerns a safety device 1 intended to detect a leakage 2 of at least one liquid called «automotive liquid» 3 used in a fluid circuit 5 onboard a motor 6 and/or a vehicle 12, said automotive liquid 3 containing at least one substance called «dangerous substance» other than water.

Said dangerous substance, and by extension the automotive liquid 3 which contains it, can be considered as dangerous, in particular because of an electric danger, for example a short-circuit, which it represents, and/or a chemical or biological danger, for example corrosion, release of noxious fumes, burning, intoxication, poisoning, combustion or causing exothermic or explosive reactions.

Among the automotive liquid(s) 3 which will be considered to contain a dangerous substance and which will consequently be made detectable and identifiable as such by the device 1, it will be possible in particular to identify one and/or the other of the following liquids: fuel, brake fluid, cooling liquid, lubricant, cleaning liquid (typically: windshield washer fluid), aqueous urea solution (or possibly another reducing agent usable for depolluting exhaust gases), etc.

Preferably, the invention relates to the detection of an automotive liquid 3 containing urea as a dangerous substance.

The invention therefore preferably concerns a safety device 1 intended to detect a leakage 2 of a urea solution 3 in an area called «dry area» 4 which is normally, in the absence of leakage 2, free from said urea solution 3.

It is meant by «urea solution» 3, a liquid (solution) containing urea, and more particularly a liquid containing urea in aqueous form, in solution with water.

By way of example, the urea solution 3 can be formed by a mixture of the «AdBlue®» type, containing 20% to 40% urea by weight, and for example between 30% and 35% urea by weight (typically 32.5%±0.7%), and the additional water.

In the following, reference will therefore preferably be made, by simple convenience of description and without this constituting a restriction of the invention, to an automotive liquid constituted by a urea solution 3.

Of course, the invention concerns a fluid circuit 5 for a vehicle 6 and/or a vehicle 12, containing an automotive liquid 3, said fluid circuit 5 being equipped with a safety device 1 according to any one of the variants of the invention in order to ensure a selective detection of a leakage 2 of the automotive liquid 3 out of said fluid circuit 5.

Said fluid circuit 5 will be advantageously controlled by an electronic management system 11.

Figure 1:
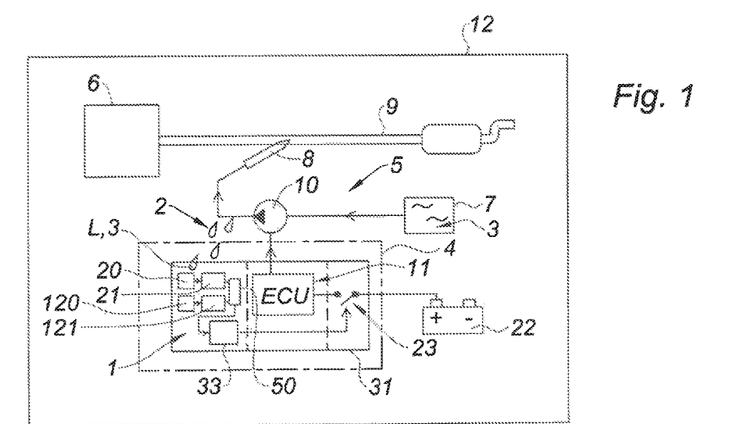
FIG. 1 illustrates, according to a schematic overview, the implantation of a safety device according to the invention within a vehicle.

As illustrated in FIG. 1, the invention concerns more particularly a fluid circuit 5 forming a urea depollution circuit 5, which allows reducing the emissions of nitrogen oxides of a motor 6, in particular an inner combustion motor 6, by selective catalytic reduction («SCR»).

In a manner known per se, such a urea depollution circuit 5 comprises a reservoir 7 intended to contain a urea solution 3, at least one injector 8 allowing the injection of said urea solution 3 into an exhaust line 9 of the motor 6, a pump 10 allowing to transfer the urea solution 3 from the reservoir 7 up to the injector 8, and an electronic management system 11 of the onboard computer kind (called also «ECU» for «Electronic Control Unit»), which ensures the control of said depollution circuit 5 (and more particularly which ensures the activation and the servo-control of the pump 10 and of the injector 8).

Preferably, and as illustrated in FIG. 1, the electronic management system 11 of said urea depollution circuit 5, placed in a dry area 4 (typically the dry area 4 monitored by the safety device 1), is advantageously protected by a safety device 1 according to any one of the variants of the invention.

Of course, the urea depollution circuit 5 can be applied, without departing from the scope of the invention, to any type of nitrogen oxide-emitter motor 6, and in particular to any inner combustion motor, in particular a Diesel motor, whatever its destination, and for example whether said motor 6 is used to propel a motor vehicle 12 or to drive a pump, produce electricity within a generating set, etc.

This being the case, the invention will preferably concern, as such, a motor vehicle 12 equipped with such a urea depollution circuit 5.

More generally, the invention will of course concern a motor vehicle 12 equipped with a fluid circuit 5 provided with, and therefore monitored and protected by, a safety device 1 according to the invention.

According to the invention, and as detailed in particular in FIG. 2, the safety device 1 (hereinafter «device») comprises a detection cell 20 (or «probe»), arranged to perceive the presence of a liquid L in an area called «dry area» 4 which is normally, in the absence of leakage 2, free from the automotive liquid 3.

Said detection cell 20 is advantageously sensitive, on the one hand, to the presence of a liquid L in said dry area 4 and, on the other hand, to the possible dangerous substance content of said liquid L.

In other words, the detection cell 20 advantageously has its characteristics, and more generally its state, modified depending on the presence or absence of a liquid L in the dry area, but also depending on the composition of said liquid, and therefore on one or more property/properties of said liquid L which is/are such as to characterize the belonging or the non-belonging of said liquid L to the category of the automotive liquids 3 (which necessarily come from a leakage 2, and are judged dangerous).

The device 1 also comprises a selective analysis unit 21, capable of distinguishing on the one hand whether the detection cell 20 is in the presence of a liquid L or not, and on the other hand, in the presence of liquid L (that is to say if the detection cell 20 effectively detects a presence of liquid in the dry area 4), whether the present liquid L (in the dry area 4) corresponds to the at least one automotive liquid 3 (and more generally to any of the identified automotive liquids 3, considered as dangerous, and therefore monitored by the device 1) containing the dangerous substance or, on the contrary, to another liquid, called «neutral liquid», such as a water condensate.

In other words, the device 1 also comprises a selective analysis unit 21 capable of performing, when the presence of a liquid L is detected by the detection cell 20, a classification of the detected liquid L according to at least one property of said detected liquid L which is sensitive to the dangerous substance content, and more particularly to the urea content, of said detected liquid L so as to be able to distinguish between a liquid L corresponding to an automotive liquid 3, judged dangerous, and at least one liquid L other than said urea solution, forming a liquid judged neutral, such as a water condensate, also likely to enter or to be formed in the dry area 4.

More particularly, the device 1 and therefore the detection cell 20 and the associated analysis unit 21 can be configured to selectively detect an automotive liquid 3 formed by an aqueous urea solution 3 used in a urea depollution circuit 5 (and therefore initially present in said depollution circuit 5 in normal operation).

Thus, the device 1 will be preferably configured to selectively detect, among several liquids L likely to reach the dry area 4 either in normal operation or accidentally following a failure (leakage 2), the presence in said dry area 4 of an automotive liquid 3 formed by an aqueous urea solution 3 (or a solution of any other reducing agent intended to the exhaust gas depollution and considered as a dangerous substance).

It may be considered as a «neutral» liquid, whose presence (in the dry area 4) will be detectable but will not give rise (must not give rise) to the triggering of a safety, any liquid whose presence has no significant impact on the operation of the protected electronic system 11, or more generally of the motor 6 and/or of the vehicle 12, in particular due to a low mineralization or low corrosivity of said liquid.

Particularly, pure (or quasi-pure) water resulting from simple normal and predictable atmospheric condensation phenomena in the dry area 4 will be considered as a neutral liquid (and where appropriate as representative of the family of the neutral liquids).

In practice, different liquids are in fact likely to enter the dry area 4, or to be formed therein, and therefore to interact with the detection cell 20. Among these liquids L, there is in particular:

pure water which comes from the humidity contained in the atmosphere of the dry area 4, which humidity can condense temporarily in case of cooling of the enclosure of the dry area 4; indeed, in order to ensure an equilibrium of the pressures between the enclosure of the dry area 4 and the outside, while avoiding the intrusion of projections of liquid water, it is known to communicate the enclosure of the dry area with the outer atmosphere of the vehicle by means of a vent called « breathable» vent, that is to say impermeable to liquid water but permeable to air and to water vapor. This being the case, such possible condensates are constituted by pure water, that is to say water which is very little or even not mineralized, chemically neutral and very weakly conductive (and in particular more weakly conductive, where appropriate, than the automotive liquid 3, and particularly than the urea solution 3), so that the formation of such condensates can in practice be tolerated in normal operation without them affecting neither the proper operation of the protected electronic system 11 nor the safety of the vehicle 12 and its occupants;

automotive liquid 3, coming from the fluid circuit 5, and more particularly from the urea solution 3, coming from the urea depollution circuit 5; yet, on the one hand, the presence of a leakage 2, and therefore the loss of the automotive liquid 3, is prejudicial to the proper operation of the fluid circuit 5 and, on the other hand, the presence of automotive liquid 3, and more particularly of urea solution 3 in the dry area 4 is undesirable because of the chemical risks of reaction (herein of the urea with copper parts of the electronic system 11), or the electric risks of short-circuit, heating, or even fire, to which said presence of automotive liquid 3, for example because of the relatively high electric conductivity of said automotive liquid 3, which is far greater than the electric conductivity (almost zero) of pure water, exposes the electronic system 11 and the vehicle 12.

The device 1 according to the invention advantageously allows to distinguish a judged dangerous liquid L (an automotive liquid, typically a urea solution 3), of a liquid, judged neutral and therefore harmless (pure water), by characterizing the liquid L, whose presence is detected by some of its properties to which the detection cell 20 is sensitive.

For this purpose, the detection cell 20 will advantageously allow to measure a property of the liquid L, such as, in particular in the case of urea, the electric resistivity, whose value will change depending on the presence of dangerous substance, and more generally on the concentration of dangerous substance, in said liquid L, sufficiently perceptible to make the (dangerous or harmless) nature of said liquid L identifiable by the analysis unit 21.

This capacity of the device 1 to differentiate the liquids L expanding in the dry area 4 according to their degree of dangerousness will allow the device 1 to exploit this knowledge of the nature, and therefore according to the degree of dangerousness of the liquid L present in order to selectively decide whether or not to activate safety measurements according to the degree of dangerousness evaluated accordingly.

In other words, the detection of the presence of a liquid L and the distinction then made between neutral liquid and dangerous automotive liquid 3 will enable the analysis unit 21 to:

selectively control the switching of the safety device 1 from a first mode of operation, corresponding to normal operation without leakage 2 (in which the device 1 is present by default, as long as no leakage 2 of automotive fluid 3 has been diagnosed), to a second mode of operation, corresponding to a safety in case of a leakage 2, when said analysis unit 21 concludes that the automotive liquid 3 is present, and/or and on the contrary keep the safety device 1 in its first normal mode of operation as long as said analysis unit 21 concludes to an absence of liquid L or concludes that only the neutral liquid L (possibly formed of a mixture of different neutral liquids) is present in the dry area 4.

In particular, the unnecessary triggering of safety measurements should thus be avoided when only a neutral, harmless liquid (such as pure water) is present in the dry area 4.

Among the safety measurements which can be activated (alternatively or cumulatively) in case of detection of an automotive liquid 3 judged dangerous (such as a urea solution 3), that is to say which can be activated when it will be decided to activate the mode of safety, following the diagnosis of the analysis unit 21, it may be considered to:

turn off the electronic system(s) 11 (or more generally the electric systems, in particular the bundles of electric cables) exposed to the leakage 2, that is to say the electronic or electric systems on or through which the automotive liquid 3 escaped from the fluid circuit 5 is likely to flow, and therefore within which said automotive liquid 3 is likely to create a short-circuit that can cause a malfunction or a dangerous heating;

issue an alert; this alert can, for example, take the form of a fault code emitted to an outer computer to the protected electronic system 11 and fluid circuit 5, for example a computer onboard the motor 6 and responsible for the management of said motor 6, or a board computer of the vehicle 12; in an alternative or complementary manner, this alert can take the form of a sound and/or visual alert intended to attract the attention of the driver. This alert will allow informing the onboard computer and/or, respectively, the driver of the vehicle 12, of the existence of a leakage 2, or more generally of the existence of a failure in the fluid circuit 5, and consequently attracting attention to the need to proceed with a repair.

Figure 2:
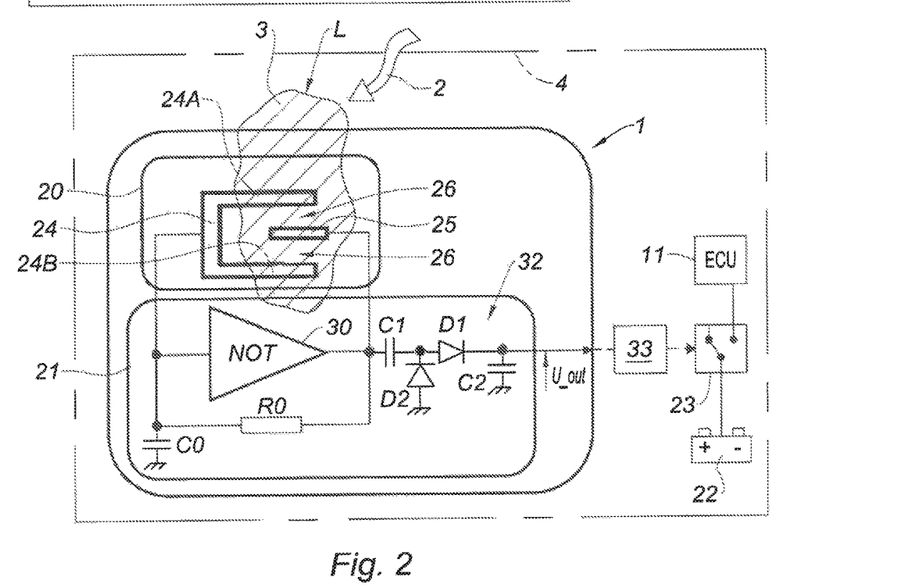
FIG. 2 illustrates, in the form of electronic diagram, a safety device according to the invention, with a simple detection assembly comprising a detection cell associated with an analysis unit.

Thus, and according to a preferential implementation possibility, the device 1 can be arranged, as illustrated in FIGS. 1 and 2, so as to protect an electronic system 11 present in the dry area 4, such as the electronic system 11 for managing the aforementioned fluid circuit 5, by causing the disconnection of the power supply 22 from said electronic system 11 when a leakage 2 of automotive liquid 3, and more particularly of urea solution 3, is detected.

According to a possible variant (called disconnection «hardware»), the disconnection can be carried out by a direct material action, the safety device 1 being able for this purpose to act directly on the opening control of an interrupter 23 which links the power supply 22, typically formed by the battery 22 of the vehicle 12, to the electronic circuit 11.

Preferably, said interrupter 23 will be formed by a relay 23 whose safety device 1 can advantageously control the supply of the switching coil.

Preferably, the interrupter 23, once opened by the safety action, can only be reset by a turning off, then a turning on of the ignition of the vehicle 12 («OFF/ON» operation).

In a variant (called «software» disconnection), the disconnection can be controlled indirectly by the safety device 1, the latter sending an instruction to a microcontroller of the electronic system 11 which drives the switching of the supply relay 23 in order to instruct said microcontroller to disconnect said electronic system 11 from its supply source 22 (that is to say to turn off the system 11 by opening the relay 23).

It should be noted that this software disconnection however does not offer, contrary to the hardware electromechanical disconnection, a guarantee of absolute protection in terms of safe operation.

In all cases, the safety device 1 will advantageously act in the manner of a (selective) circuit breaker which, in the presence of (dangerous) automotive liquid 3 in the dry area 4, and only in the presence of automotive liquid 3, will preventively turn off the electronic system 11 in order to avoid any short-circuit or runaway occurrence.

Any type of detection cell 20 suitable for the detection and the identification of liquid L can of course be used.

In absolute terms, a cell 20 capable of detecting (and differentiating) a liquid L at a distance, without contact, for example by means of an optical sensor, could be used.

However, preferably, and in particular to simplify the structure of the detection cell 20 and improve the robustness and reliability thereof, a contact detection cell 20, placed in the dry area 4 will be used, which reacts when a sufficient quantity of liquid L flows so as to cover the surface of said detection cell 20.

Preferably, the safety device 1 includes a resistive-capacitive electric detection cell 20, provided with at least one first electrode 24 and one second electrode 25 separated from each other by an air-gap 26 exposed to the liquid flows L in the dry area 4, such that the capacity C20 and the electric resistance R20 of said detection cell 20 are affected by the presence and by the composition (and therefore by either the «neutral» or on the contrary the «automotive» and dangerous character) of the liquid when said liquid L comes into contact with said detection cell 20.

Said detection cell 20 is advantageously used both as a variable resistance and as a variable capacitor, because the electric resistance R20 measured between the electrodes 24, 25 depends on the resistivity (and therefore on the conductivity, which is the opposite of the resistivity) of the substance (and particularly of the liquid L) present in the air-gap 26, between said electrodes 24, 25, while the capacity C20 of the capacitor formed by these same electrodes 24, 25 distant from one another, depends on the (relative) permittivity of said substance present in the air-gap 26.

Thus, the appearance in the air-gap 26 of a liquid L, which covers the electrodes 24, 25 and fills the air-gap 26 by forming a kind of bridge between said electrodes 24, 25, as illustrated in FIG. 2, can be perceived and characterized by two (herein electric) properties of the liquid L, namely the conductivity and the permittivity of said liquid.

Advantageously, by measuring two properties of the liquid L, and in this case by exploiting a resistivity measurement in addition to the permittivity measurement (here in the form of a capacity measurement), liquids which could not be reliably differentiated from one another by means of a single property can be distinguished. In particular, this is herein the case for water and the urea solution 3 which in practice have very close permittivity values, so that a measurement of capacity alone would not suffice to discriminate the concerned liquids.

Here, the intake of information as to the resistivity of the liquid L, which depends in particular on the mineralization of the latter, allows to easily distinguish the pure water (which has a high resistivity, greater than a predetermined threshold) of the urea solution 3 (which has a lower resistivity, lower than said threshold).

The electrodes 24, 25 of the detection cell can have any appropriate shape and dimensions.

Particularly, the first electrode 24 and the second electrode 25 can each be formed by a (single) conductive strip or rod, preferably substantially rectilinear, disposed substantially parallel to the other electrode 25, 24.

Figure 3:
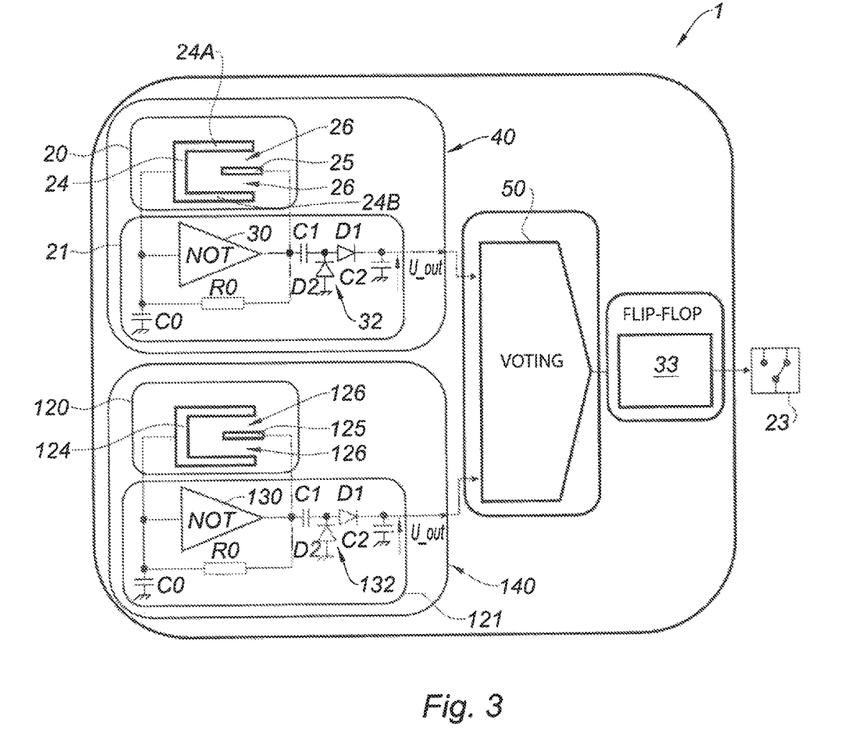
FIG. 3 illustrates, in the form of electronic diagram, a safety device according to the invention with a dual detection assembly.

However, according to a preferred arrangement, which will facilitate in particular the implantation of said electrodes 24, 25 and the corresponding electric routing on a printed circuit board, the first electrode 24 will have a «C» shape (that is to say a recumbent «U» shape), substantially rectangular, or even square, with two branches 24A, 24B, between which the second electrode 25, in turn preferably formed by a rectilinear blade, parallel to said branches 24A, 24B, will enter, as illustrated in FIGS. 2 and 3.

This «C» shape will in practice be particularly adapted to simplify the architecture of implantation and of cabling of the electronic components associated with the detection cell 20, and more particularly to simplify the connection of the detection cell 20 to an integrated circuit, particularly to a six-legged integrated circuit.

Preferably, the second electrode 25 will be located equidistant from each of said parallel branches 24A, 24B, so as to form two substantially equal air-gaps 26, and therefore to define two identical equivalent resistances in parallel to one another, and two equivalent identical capacitors in parallel to one another.

Preferably, and according to a characteristic which can constitute a full-fledged invention, the analysis unit 21 includes an oscillator 30 whose oscillation frequency f30 varies as a function of the values of resistance R20 and of capacity C20 of the detection cell 20.

In a particularly advantageous manner, the use of a (resistive-capacitive) detection cell RC involving jointly a capacity C20 which varies according to the presence and according to the composition of the liquid L and a resistance R20 which also varies according to the presence and according to the composition of the liquid L, allows to directly exploit the information collected by the detection cell 20, by associating said cell 20 with an oscillator 30 whose variable frequency f30 depends, on the one hand, on said capacity C20 and, on the other hand, on said resistance R20.

The invention thus allows to obtain a high-performance liquid identification and discrimination tool, and very sensitive to the composition of the liquid L, by means of very simple, reliable, robust and inexpensive components, and whose lifetime is particularly high.

The oscillator 30, whose frequency f30 is sensitive to the variations of capacity C20 and resistance R20 of the detection cell 20, can advantageously be formed in a very simple manner by a logic gate of the inverter («NOT») type, at the input of which the first electrode 24 is connected and at the output of which the second electrode 25 is connected, as illustrated in FIGS. 2 and 3.

The basic oscillation frequency of the oscillator 30 (in the absence of liquid L), can moreover be chosen by means of an adjustment capacitor C0 and an adjustment resistance R0, whose (fixed) values are predetermined, as illustrated in FIGS. 2 and 3.

Preferably, for convenience of manufacture, the first electrode 24 and the second electrode 25 of the detection cell 20 can be engraved in the form of (exposed) conductive tracks on the surface of a circuit support 31 comprising an insulating substrate.

Said circuit support 31, and more particularly its insulating substrate, can be rigid or, on the contrary, flexible.

Particularly, said circuit support 31 can be formed by a printed circuit on a flexible thermoplastic film, by a printed circuit on ceramic, by a printed circuit on a molded thermoplastic polymer block («Molded Interconnect Device»), or by a conventional multilayer rigid printed circuit board.

Where appropriate, the circuit support 31 comprising the electrodes 24, 25, or even more generally the detection cell 20, can form a plug-in board or a plug-in flexible strip provided with a connector allowing the mechanical and electric reversible connection of the electrodes, and more generally of the detection cell 20, to the analysis unit 21.

The electrodes 24, 25 and, more generally, the detection cell 20 can thus be easly placed at a distance relative to the rest of the safety device 1, to place said electrodes 24, 25, respectively, said detection cell 20, as close as possible to a potential leakage source 2, or to the low (lowest) point of the dry area 4, the most able to collect the automotive liquid 3 in case of leakage.

Similarly, for convenience of manufacture and integration, the analysis unit 21 preferably comprises an electronic analysis circuit whose electronic components (herein typically the oscillator 30, the adjustment capacitor C0, the adjustment resistor R0, but also a filtering capacitor C1, a smoothing capacitor C2, as well as straightening diodes D1, D2 described below) are integrated on a circuit support which comprises an insulating substrate provided with conductive tracks linking together said components 30, C0, R0, C1, C2, D1, D2.

Here again, said circuit support receiving the analysis unit 21, and more particularly the insulating substrate of said circuit support, can be flexible or rigid, said circuit support being for example formed by a printed circuit on a flexible thermoplastic film, by a printed circuit on ceramic or on a molded thermoplastic polymer block «MID» («Molded Interconnect Device»), or by a rigid printed circuit board.

According to an arrangement possibility, the detection cell 20 can include its own (first) circuit support, forming a plug-in board or a flexible plug-in strip connected on the (second) distinct circuit support of the analysis unit 21.

However, according to a preferred possibility of arrangement, the analysis unit 21 and the detection cell 20 may be carried by one and the same circuit support 31, as illustrated in FIG. 1.

It will thus be possible to take advantage of a conductive layer (made apparent according to the path of the electrodes 24, 25) belonging to the laminated structure of the circuit support 31 to integrate directly and entirely, in the form of copper tracks, the detection cell 20 with said shared circuit support 31.

Said circuit support 31 can even serve more generally as a support for the safety device 1 as a whole.

Thus, the manufacturing of the device 1 is more compact and is simplified.

Such an integration is all the more easy that the surface area occupied by the detection cell 20, and more particularly by the first «C»-shaped electrode 24 is preferably part of a square whose measurement of the side is lower than 1 cm, and for example in the order of 6 mm (which will herein correspond to the length of each branch 24A, 24B).

Moreover, the electronic system 11 to be protected, present in the dry area 4, such as the electronic system 11 for managing the aforementioned urea depollution circuit 5, is preferably also integrated on an electronic circuit board of the kind printed circuit or MID.

According to an embodiment, the safety device 1 can be, in whole or in part (and in particular as regards the detection cell 20), moved from the electronic system to be protected 11, on a plug-in board or a plug-in flexible strip connected to the electronic board on which said electronic system 11 is integrated.

According to another embodiment, the safety device 1 can be integrated on the same electronic board (then noted 31 for convenience) of the printed circuit kind as the electronic system 11 which it protects, as illustrated in FIG. 1.

In other words, the safety device 1, or even more particularly the detection cell 20, can be advantageously disposed on the same circuit support 31 as the electronic system 11.

The use of a common circuit support 31 not only allows to have more compactness and simplicity of manufacture, but also to place, where appropriate, the detection cell 20 as close as possible to the area which is likely to become dangerous in case of leakage 2 of automotive liquid 3, and more particularly in case of leakage of urea solution 3 (that is to say closer to the area where harmful chemical reactions or short-circuits are likely to occur in case of leakage of automotive liquid 3), which improves the rapidity, reliability and relevance of the leakage detection 2.

Preferably, the electronic board supporting the protected electronic system 11, or even, where appropriate, the circuit support 31 common to the safety device 1 and to the protected electronic system 11, also serves as a support to the relay 23 which controls the supply of said electronic board (respectively of the common circuit support 31).

In this way, the intervention of the safety device 1 in case of detection of a leakage of automotive liquid 3 will allow to automatically cut off the supply to said electronic board, respectively to said shared circuit support 31, which will avoid any risk of runaway or short-circuit of the protected electronic system 11.

According to a preferred arrangement, the detection cell 20 and, more generally, the safety device 1 and, where appropriate, the board 31 carrying the protected electronic system 11 and the safety device 1, will be located just below the reservoir 7, to optimize and accelerate the leakage detection 2.

Preferably, and as illustrated in FIG. 2, the analysis unit 21 comprises a frequency-to-voltage converter 32, preferably a diode rectifier bridge converter D1, D2, which is arranged to convert the oscillation frequency f30 into an output voltage U_out, representative of the presence of a liquid L and of the composition (and therefore of the «neutral» or, on the contrary «automotive» and dangerous character) of the detected liquid L.

More particularly, the converter 32 can comprise a filtering capacitor C1 intended to eliminate a possible continuous component of the oscillating signal sensed at the output of the oscillator 30, and then a diode rectifier bridge D1, D2, allowing herein to retain only the positive alternation of said oscillating signal, and finally a charging capacitor C2, which smoothes said positive alternation in the form of an average voltage, and at the terminals of which the output (average) voltage U_out is therefore measured.

Here again, such a converter 32, made by means of simple, robust and inexpensive components, allows to obtain a reliable, rapid and simple conversion of the oscillation frequency f30 into an output voltage U_out which is advantageously intrinsically representative of the resistance R20 and of the capacity C20 of the detection cell (at the considered instant).

The value of the output voltage U_out (typically comprised between 0V and 5V, to be exploitable by standardized logic gates) therefore allows to identify not only the presence but also the nature of the detected liquid L.

It should be noted that, with the mounting illustrated in FIG. 2, the output voltage U_out decreases when the oscillation frequency f30 decreases (which occurs in the presence of automotive liquid 3, and more particularly in the presence of urea solution 3).

By way of indication, the output voltage in the presence of automotive liquid 3, and more particularly in the presence of urea solution 3, can be lower than 2.5V, and for example in the order of 2.35V.

Ultimately, the analysis unit 21 herein preferably comprises two stages:
 a first upstream stage, forming a frequency generator f30 which comprises the oscillator 30 placed in dependence on the values of capacity C20 and of resistance R20 taken by the detection cell 20;
 and a second stage formed by the aforementioned frequency-to-voltage converter 32.

Preferably, the analysis unit 21, when it concludes that the automotive liquid 3, and more particularly urea solution 3, is present in the dry area 4, is arranged to trigger the change of state of a memory flip-flop 33, so that said flip-flop 33 acquires and retains, once activated by the analysis unit 21, a state which corresponds to the activation of the safety mode of the device 1 in case of a leakage 2.

As indicated above, the activation of the safety mode allows to signal the existence of a leakage 2 and/or, preferably, to make safeguard arrangements relative to said leakage 2, in particular by cutting off the power supply of the electric and/or electronic circuit(s) 11 threatened by a contact with the automotive liquid 3 emanating from said leakage 2.

Before detection of a leakage 2 of automotive liquid 3, and more particularly of urea solution 3, the output voltage U_out is sufficiently high (typically in the order of 5V) to be located above the low triggering threshold of the flip-flop 33, so that the binary flip-flop 33 is in a first state (herein typically the value 1) which corresponds to an absence of leakage 2 and authorizes a normal operation of the fluid circuit 5 and the protected electronic system 11.

In case of appearance of automotive liquid 3, and more particularly of urea solution 3 in the dry area 4, detected by the analysis unit 21, the output voltage U_out drops below the low triggering threshold of the flip-flop 33 (which threshold is typically in the order of 2.5V), so that said flip-flop 33 then changes state, to switch to a second state (typically herein the value 0) which signals a leakage 2 of automotive liquid 3 and causes a safety, typically a turn off of the protected electronic system 11.

Advantageously, the flip-flop 33 cannot be reset to its first state by said output voltage U_out, so that once the flip-flop 33 is triggered, the second state (zero flip-flop value) persists, whatever the subsequent changes which affect the output voltage U_out, and therefore whatever the possible modifications of the wetting conditions of the detection cell 20 by the automotive liquid 3, and more particularly by the urea solution 3.

Thus, when a leakage 2 (of urea) is detected, the safety is maintained definitively, even if the droplets of automotive liquid 3, and more particularly of urea solution 3 which had allowed the detection of said leakage 2 finally leave the detection cell 20 (for example under the effect of gravity).

Such a precaution allows not deactivating wrongly the safety measurements, even though the leakage 2, and therefore the danger it represents, is always well present.

The resetting of the flip-flop 33 can be forced only by an outer operation, for example by turning off, then turning on the ignition of the vehicle 12 («OFF/ON» operation).

Of course, it is possible to use, in particular for the sake of compactness and cost-saving, a safety device 1 comprising a single detection assembly, comprising a detection cell 20 associated with an analysis unit 21.

However, according to a preferred variant, corresponding to that illustrated in FIG. 3, the safety device 1 includes a first detection assembly 40, comprising a first detection cell 20 associated with a first analysis unit 21, and a second detection assembly 140 distinct from the first detection assembly 40 and comprising a second detection cell 120 associated with a second analysis unit 121.

The safety device 1 then also comprises a voting circuit 50, which concludes that a leakage 2 of automotive liquid 3, and more particularly a leakage 2 of urea solution 3 exists, if and only if the first detection assembly 40 and the second detection assembly 140 indicate simultaneously the existence of a leakage 2 of automotive liquid 3, and more particularly of urea solution.

Advantageously, the multiplication of the detection assemblies 40, 140 independent of one another allows avoiding the «false-positives» by basing the leakage 2 diagnosis on (at least) two measurement sources instead of a single one, while the voting circuit 50 allows to make a diagnosis of leakage 2 only if such a diagnosis is shared, that is to say, established by "common agreement", by at least two of the different detection assemblies 40, 140.

In practice, the redundancy of the detection assemblies 40, 140 allows to keep the protected electronic system 11 safe (and more particularly to trigger its turning off) only in the real and confirmed presence of a leakage 2, which avoids in particular any untimely turning off of said electronic system 11 which would be due to a failure of only one of said detection assemblies 40, 140, and more particularly due to a temporary failure, according to which one of said detection assemblies 40 would make a measurement or interpretation error and would temporarily signal wrongly the presence of a dangerous automotive liquid 3 (by mistakenly concluding that an automotive liquid 3 is present).

Thanks to the redundancy of the detection assemblies 40, 140, the probability of safety of the electronic system 11 due to a diagnostic error is lower than the individual probability of failure (probability, incompressible, of occurrence of a false positive) of each of the detection assemblies 40, 140.

Consequently, it is thus possible to generally increase the availability rate, that is to say the active normal operation time, without interruption due to a safety, of the electronic system 11, and more generally the availability rate of the fluid circuit 5 driven by said electronic system 11.

Of course, the (first) detection cell 20 of the first detection assembly 40 and the (second) detection cell 120 of the second detection assembly 140 will be placed in a configuration such that the same flow of liquid L, and more particularly of urea solution 3, in the dry area 4 in case of leakage 2, can effectively cover and affect at the same time said two detection cells 20, 120.

Otherwise, the multiplication of the detection assemblies 40, 140 allows very advantageously the safety device 1 to remain operational even in case of failure of one of said detection assemblies 40, 140, and in particular in case of a definitive breakdown of one of said detection assemblies 40, 140, as long as the other detection assembly 140, 40 operates correctly.

Indeed, it is sufficient to configure each detection assembly 40, 140 so that, in case of failure, and in particular in case of breakdown of its oscillator 30, 130, said detection assembly adopts (by default) a failure mode according to which its output voltage U_out has a value which produces the same effect as an output voltage characteristic of a diagnosis of the presence of automotive liquid 3 leakage 2.

By way of example, the output voltage U_out in failure mode can be substantially zero, and therefore lower than the low threshold which characterizes a leakage 2 of automotive liquid 3.

The voting circuit 50 will test, in turn, the two output voltages U_out emitted respectively at the output of the first detection assembly 40 and at the output of the second detection assembly 140, and will only conclude that a leakage 2 of automotive liquid 3 is really present if each of these two output voltages indicates that the corresponding sub-assembly 40, 140 considers that it is in the presence of a leakage 2 of automotive liquid 3 (or, where appropriate, in the failure mode).

The memory flip-flop 33 can advantageously be placed downstream of the voting circuit 50, as shown in FIG. 3, so as to retain the active safety mode (that is to say, to maintain active safety measurements) once said flip-flop 33 is triggered by the voting circuit 50, as explained above.

It should be noted that the characteristics of the second detection assembly 140 and its constituent elements (detection cell 120, analysis unit 121) can be deduced mutatis mutandis from the characteristics of the first detection assembly 40 and its constituent elements (detection cell 20, analysis unit 21), as described in the foregoing.

Preferably, and for convenience of standardization, the two detection assemblies 40, 140 have exactly identical structures.

For convenience of description, the elements of the second detection assembly 140 (detection cell 120, analysis unit 121, electrodes 124, 125, air-gaps 126, oscillator 130, frequency-to-voltage converter 132) have therefore received incremented references of a value 100 relative to the references of the homologous elements of the first detection assembly 40.

Where appropriate, it would be possible to provide for more detection assemblies 40, 140, for example at least three independent detection assemblies, and then use a voting circuit 50 which would conclude that a leakage 2 of automotive liquid 3 is present and would consequently activate the safety mode via the flip-flop 33, if a predetermined number or a predetermined proportion, preferably a majority proportion, of detection assemblies (for example two assemblies, out of a total of three assemblies) simultaneously detect the presence of urea solution 3 in the dry area 4.

Finally, the invention concerns of course as such a method in which the presence of a liquid L in the dry area 4 is tested and the composition of said liquid L is analyzed so as to be able to distinguish a leakage 2 of automotive liquid 3, and more particularly of urea solution 3, on the one hand, and of the appearance in said dry area 4 of another neutral liquid, considered to be harmless, such as a water condensate, on the other hand.

More particularly, for this purpose, the electric resistance R20 and the capacity C20 between two electrodes 24, 25 exposed to the liquid (and thus forming, as a whole, a detection cell 20) will be measured, as described above, preferably by using the variations of the resistance R20 and those of the capacity C20 to detectably modify the oscillation frequency f30 of an oscillator 30, and consequently the output voltage U_out collected by a converter 32 with rectifier C1, D1, D2, C2 at the output of said oscillator 30.

According to whether the detected liquid L will be considered or not as a leakage of automotive liquid 3, and more particularly as a leakage of urea solution 3, safety actions and in particular an automatic disconnection of the concerned electronic board 31 will be then triggered or, on the contrary, refrained from triggering.

Of course, the invention is in no way limited to the sole aforementioned variants, the person skilled in the art being in particular likely to isolate or freely combine together either of the characteristics described in the foregoing, or to substitute equivalents thereof.

Thus, particularly, the invention could in particular be applied to any circuit 5 in which a urea solution 3 circulates, whether said urea circuit 5 is intended for exhaust gas depollution or for another purpose.

The invention claimed is:

1. A safety device configured to detect a leakage of at least one automotive liquid used in a fluid circuit onboard a motor and/or a vehicle, said automotive liquid containing at least one dangerous substance that is other than water, said device comprising:
    a detection cell, arranged to perceive the presence of the automotive liquid in a dry area which is normally, in the absence of leakage, free from said automotive liquid, said detection cell being sensitive to the presence of liquid in said dry area and to the possible dangerous substance content of said liquid, and
    a selective analysis unit, configured for distinguishing whether the detection cell is in the presence of liquid or not, and in the presence of liquid, whether the present liquid corresponds to the at least one automotive liquid containing the dangerous substance such that said analysis unit can selectively control switching of the safety device from a first mode of operation, corresponding to normal operation without leakage, to a second mode of operation, corresponding to a safety in case of a leakage, when said analysis unit concludes that the automotive liquid is present, and on the contrary maintain the safety device in its first normal mode of operation as long as said analysis unit concludes that liquid is absent.

2. The device according to claim 1, wherein the safety device is configured to selectively detect the automotive liquid formed by an aqueous urea solution used in a urea depollution circuit.

3. The device according to claim 1, wherein the detection cell is a resistive-capacitive electric detection cell, provided with at least one first electrode and one second electrode separated from each other by an air-gap exposed to the liquid flows in the dry area, such that capacity and electric resistance of said detection cell are affected by a presence and a composition of the liquid when said liquid comes into contact with said detection cell, and in that the analysis unit includes an oscillator whose oscillation frequency varies as a function of values of resistance and of capacity of the detection cell.

4. The device according to claim 3 wherein the analysis unit comprises an electronic analysis circuit whose electronic components are integrated on a circuit support which comprises an insulating substrate provided with conductive tracks linking together said components and in that the first electrode and the second electrode of the detection cell are engraved on a surface of said circuit support, in the form of conductive tracks.

5. The device according to claim 3, wherein the analysis unit comprises a frequency-to-voltage converter which is arranged to convert an oscillation frequency into an output voltage, representative of the presence of an automotive liquid and of the composition of the detected liquid.

6. The device according to claim 1, wherein the analysis unit, when it concludes that the automotive liquid is present in the dry area, is arranged to trigger the change of state of a memory flip-flop, so that said flip-flop acquires and retains, once activated by the analysis unit, a state which corresponds to an activation of the safety mode of the device in case of the leakage.

7. The device according to claim 1, wherein the safety device comprises:
 a first detection assembly, comprising a first detection cell associated with a first analysis unit,
 a second detection assembly, distinct from the first detection assembly and comprising a second detection cell associated with a second analysis unit, and
 a voting circuit, which concludes that the leakage of automotive liquid exists if and only if the first detection assembly and the second detection assembly indicate simultaneously an existence of a leakage of automotive liquid.

8. The device according to claim 1, wherein the safety device is arranged to protect an electronic system present in the dry area by causing a disconnection of a power supply from said electronic system when the leakage of automotive liquid is detected.

9. The device according to claim 1, wherein the safety device is configured to protect an electronic system present in the dry area, and in that said device is integrated on a same electronic card, of the printed circuit kind, as an electronic system that said device protects.

10. The device according to claim 1, wherein said device is configured to detect the leakage of the automotive liquid and the leakage of a neutral liquid different from the automotive liquid, and wherein the selective analysis unit is configured for distinguishing whether the detection cell is in the presence of liquid or not, and in the presence of liquid, whether the present liquid corresponds to the automotive liquid or to the neutral liquid.

11. The device according to claim 10, wherein the neutral liquid is water condensate.

12. A fluid circuit for a motor and/or a vehicle, containing an automotive liquid, said fluid circuit wherein it is equipped with a safety device according to claim 1 to ensure a selective detection of the leakage of the automotive liquid out of said fluid circuit.

13. The fluid circuit according to claim 12, wherein the fluid circuit constitutes a urea depollution circuit comprising a reservoir configured to contain a urea solution, at least one injector allowing injection of said urea solution into an exhaust line of a motor, a pump allowing to transfer the urea solution from the reservoir up to the injector, and an electronic management system ensuring control of said depollution circuit, said electronic management system being placed in a dry area and protected by the safety device.

14. A motor vehicle equipped with a fluid circuit according to claim 12.

* * * * *